United States Patent
Jiang et al.

(10) Patent No.: US 10,674,312 B2
(45) Date of Patent: Jun. 2, 2020

(54) LOCATING AND TRACKING A WIRELESS BEACON FROM A WIRELESS DEVICE

(71) Applicant: Hewlett Packard Enterprise Development LP, Houston, TX (US)

(72) Inventors: Yurong Jiang, Palo Alto, CA (US); Kyu Han Kim, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 15/791,410

(22) Filed: Oct. 24, 2017

(65) Prior Publication Data
US 2019/0124470 A1 Apr. 25, 2019

(51) Int. Cl.
*H04W 4/02* (2018.01)
*H04W 64/00* (2009.01)
*H04B 17/318* (2015.01)
*H04W 4/80* (2018.01)

(52) U.S. Cl.
CPC ........ *H04W 4/023* (2013.01); *H04W 64/00* (2013.01); *H04B 17/318* (2015.01); *H04W 4/80* (2018.02)

(58) Field of Classification Search
CPC ..... H04W 4/023; H04W 17/318; H04W 4/80; H04W 4/04; H04W 4/043; H04W 4/046; H04W 64/00
See application file for complete search history.

(56) References Cited

U.S. PATENT DOCUMENTS

| | | | |
|---|---|---|---|
| 8,885,581 B2 | 11/2014 | Tee et al. | |
| 9,372,922 B2 | 6/2016 | Shaashua et al. | |
| 9,485,627 B2 | 11/2016 | David et al. | |
| 2008/0161011 A1* | 7/2008 | Babin | H04W 64/00 455/456.1 |
| 2010/0321241 A1* | 12/2010 | Janosky | G01S 3/785 342/444 |
| 2011/0045844 A1* | 2/2011 | Muller | G01S 5/0205 455/456.1 |
| 2012/0129546 A1* | 5/2012 | Yang | G01S 5/0252 455/456.1 |
| 2012/0182933 A1* | 7/2012 | Bandhakavi | G01S 5/0242 370/328 |

(Continued)

OTHER PUBLICATIONS

Li, W, W-L. et al.; "A Smartphone Localization Algorithm Using RSSI and Inertial Sensor Measurement Fusion"; 2013; 6 pages.

(Continued)

*Primary Examiner* — Dinh Nguyen
(74) *Attorney, Agent, or Firm* — Hewlett Packard Enterprise Patent Department

(57) ABSTRACT

Examples disclosed herein relate to locating and tracking a wireless beacon from a wireless device. A data collection module in the wireless device collects and processes sensory data from the wireless beacon. A location estimation module classifies an environment surrounding the wireless beacon based on the sensory data, determines a movement of the wireless device and a movement of the wireless beacon, and estimates a location of the wireless beacon based on the sensory data, the classified environment, the determined movement of the wireless device and the determined movement of the wireless beacon. A calibration module refines the location of the wireless beacon based on neighboring wireless beacons.

20 Claims, 13 Drawing Sheets

(56) References Cited

U.S. PATENT DOCUMENTS

| | | | | |
|---|---|---|---|---|
| 2012/0184292 | A1* | 7/2012 | Lin | H04W 24/10 |
| | | | | 455/456.1 |
| 2013/0023282 | A1* | 1/2013 | Lin | G01S 5/021 |
| | | | | 455/456.1 |
| 2014/0073252 | A1* | 3/2014 | Lee | H04W 4/008 |
| | | | | 455/41.2 |
| 2014/0099971 | A1* | 4/2014 | Lim | G01S 5/0027 |
| | | | | 455/456.1 |
| 2015/0110259 | A1* | 4/2015 | Kaye | H04W 4/80 |
| | | | | 379/202.01 |
| 2016/0026837 | A1* | 1/2016 | Good | H04W 4/02 |
| | | | | 340/539.13 |
| 2016/0050564 | A1* | 2/2016 | Niewczas | H04W 12/06 |
| | | | | 455/411 |
| 2016/0061933 | A1* | 3/2016 | Chung | H04W 4/023 |
| | | | | 455/456.1 |
| 2016/0274229 | A1 | 9/2016 | Oh et al. | |
| 2016/0323717 | A1* | 11/2016 | Friday | H04W 4/043 |
| 2017/0013409 | A1* | 1/2017 | Cerchio | G01C 25/005 |
| 2017/0064515 | A1 | 3/2017 | Heikkila et al. | |
| 2017/0371322 | A1* | 12/2017 | Lake | G05B 19/41855 |

OTHER PUBLICATIONS

Wang, F. et al.; "Probabilistic Region-based Localization for Wireless Networks"; Nov. 21, 2006; 12 pages.
Apple iBeacon, available online at <https://web.archive.org/web/20170424043602/https://developer.apple.com/ibeacon/>, Apr. 24, 2017, 2 pages.
Aruba Beacons, "Solution Overview Mobile Engagement", retrieved on Dec. 14, 2018, 4 pages.
Bahl et al., "RADAR: An in-building RF-based user location and tracking system", In IEEE INFOCOM, 2000, pp. 775-784.
Berndt et al., "Using dynamic time warping to find patterns in time series", AAAIWS'94 Proceedings of the 3rd International Conference on Knowledge Discovery and Data Mining, 1994, pp. 359-370.
BLE Specification, "The building blocks of all Bluetooth devices", available online at <https://web.archive.org/web/20170729151150/https://www.bluetooth.com/specifications/>, Jul. 29, 2017, 2 pages.
Blumrosen et al., "Enhanced calibration technique for rssi-based ranging in body area networks", Ad Hoc Networks, Aug. 13, 2012, 15 pages.
Chen et al., "Invisible sensing of vehicle steering with smartphones", In ACM MobiSys, 2015, pp. 1-13.
Chintalapudi et al., "Indoor localization without the pain", In ACM MobiCom, 2010, pp. 173-184.
Conte et al., "Bluesentinel: A first approach using ibeacon for an energy efficient occupancy detection system", In ACM BuildSys, 2014, pp. 11-19.
Eddystone Beacon, "Mark up the world using beacons", available online at <https://web.archive.org/web/20170709220129/https://developers.google.com/beacons/>, Jul. 9, 2017, 3 pages.
Estimote, "Create magical experiences in the physical world", available online at <https://web.archive.org/web/20170106210313/http://estimote.com/>, Jan. 6, 2017, 19 pages.
John Greenough, "The 'Internet of Things' Will Be the World's Most Massive Device Market and Save Companies Billions of Dollars", available online at <https://www.businessinsider.in/The-Internet-of-Things-Will-Be-The-Worlds-Most-Massive-Device-Market-And-Save-Companies-Billions-Of-Dollars/articleshow/44766662.cms>, Oct. 10, 2014, 43 pages.
Joseph Waring, "Number of devices to hit 4.3 per person by 2020—report", Oct. 16, 2014, 8 pages.
Kotaru et al., SpotFi: Decimeter Level Localization Using WiFi, In ACM SIGCOMM, 2015, pp. 269-282.
Kumar et al., "LTE Radio Analytics Made Easy and Accessible", In ACM SIGCOMM, 2014, pp. 211-222.
Kumar et al., Accurate indoor localization with zero start-up cost, In ACM MobiCom, 2014, pp. 483-494.
Li et al., "A reliable and accurate indoor localization method using phone inertial sensors", In ACM UbiComp, 2012, pp. 421-430.
Mariakakis et al., "Sail: Single access point-based indoor localization", In ACM MobiSys, 2014, pp. 315-328.
Radius Netwoks, "RadBeacon USB", 2015, 2 pages.
Ratanamahatana et al., "Everything you know about dynamic time warping is wrong", In Third Workshop on Mining Temporal and Sequential Data, 2004, 11 pages.
Roy et al., I am a smartphone and i can tell my user's walking direction. In ACM MobiSys, 2014, 329-342.
Sen et al., "Avoiding Multipath to Revive Inbuilding WiFi Localization", In ACM MobiSys, 2013, pp. 249-262.
Sen et al., "Bringing cupid indoor positioning system to practice", In WWW, 2015, pp. 938-948.
Sen et al., "You are facing the mona lisa: Spot localization using PHY layer information", In ACM MobiSys, 2012, pp. 183-196.
Shangguan et al., "Relative localization of RFID tags using spatial-temporal phase profiling", In USENIX NSDI, 2015, pp. 251-263.
Shu et al., "Last-mile navigation using smartphones", In ACM MobiCom, 2015, pp. 512-524.
Sun et al., "Moloc: On distinguishing fingerprint twins", In IEEE ICDCS, Jul. 2013, pp. 226-235.
Wang et al., "Dude, where's my card?: Rfid positioning that works with multipath and non-line of sight", In ACM SIGCOMM, 2013, pp. 51-62.
Xiong et al., "ArrayTrack: A Fine-grained Indoor Location System" In USENIX NSDI, 2013, pp. 71-84.
Youssef et al., "The horns wlan location determination system", In ACM MobiSys, 2005, pp. 205-218.
Zhang et al., I am the antenna: Accurate outdoor ap location using smartphones, In ACM MobiCom, 2011, pp. 109-120.

\* cited by examiner

LOCATING AND TRACKING A WIRELESS BEACON FROM A WIRELESS DEVICE

BACKGROUND

Wireless beacons are hardware transmitter devices that broadcast information to other wireless devices in their vicinity. They have recently become very popular in numerous emerging applications such as Internet of Things ("IoT"), Augmented Reality ("AR"), wearables, health care, and home automation, among others. The information broadcasted can range from location data, ambient data, movement or orientation data, or any other information capable of being transmitted under a wireless communications protocol or standard over relatively short distances (e.g., within 15 meters). An example wireless standard for wireless beacons is the Bluetooth Low Energy ("BLE") standard, designed to provide considerably reduced power consumption and cost. BLE beacons are usually powered by coin cell batteries and designed to guarantee 1-3 years of lifetime. They are also designed to operate within a dedicated frequency range (e.g., between 2.4 and 2.485 Hz) and output a low maximum power (e.g., 10 mW for the current BLE v4.2 specification), which is 10× lower than the WiFi transmission power specified by the FCC.

The power-saving features of BLE beacons constrain their range and also make their broadcast signals more susceptible to path loss caused by blockage of signal propagation. Further, in order to coexist with WiFi and other RF signals that operate in the same frequency range, BLE specifications incorporate narrow bandwidth and frequency hopping, thereby making BLE broadcast signals subject to frequency-selective fading. Like other RF signals, BLE beacon broadcast signals suffer from signal degradation. Multipath fading occurs when RF signals reach the receiving antenna via multiple different paths, further exacerbating the BLE signals' strength. In addition, to maximize battery life, BLE beacons are often non-connectable (i.e., set to broadcast only), which largely limits their interaction with surrounding mobile devices.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Examples for locating and tracking a wireless beacon from a wireless device are disclosed. Specifically, a wireless beacon that operates according to a wireless standard or communications protocol designed for communications over short distances (e.g., within 15 meters) is located and tracked by a wireless device (e.g., a smartphone, tablet, headset, wearable, laptop, etc.) in its vicinity. The wireless standard may be for example, the Bluetooth Low Energy ("BLE") standard or any other standard overseeing the broadcast of information from wireless beacons. The wireless beacon may be a standalone wireless beacon or a beacon within a BLE-equipped wireless device (e.g., a BLE-equipped smartphone).

In examples herein, the wireless device collects and process sensory data from the wireless beacon to be located. The sensory data may include, for example, Received Signal Strength Indicator ("RSSI") data from the wireless beacon. The wireless device uses the sensory data to classify an environment surrounding the wireless beacon, thereby enabling the wireless device to adapt an estimation of the wireless beacon's location to a changing environment. The location of the wireless beacon is ultimately determined based on the sensory data, the classified environment and determined movements of the wireless device and the wireless beacon. Location accuracy is improved by refining or calibrating the location estimate to account for neighboring wireless beacons.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
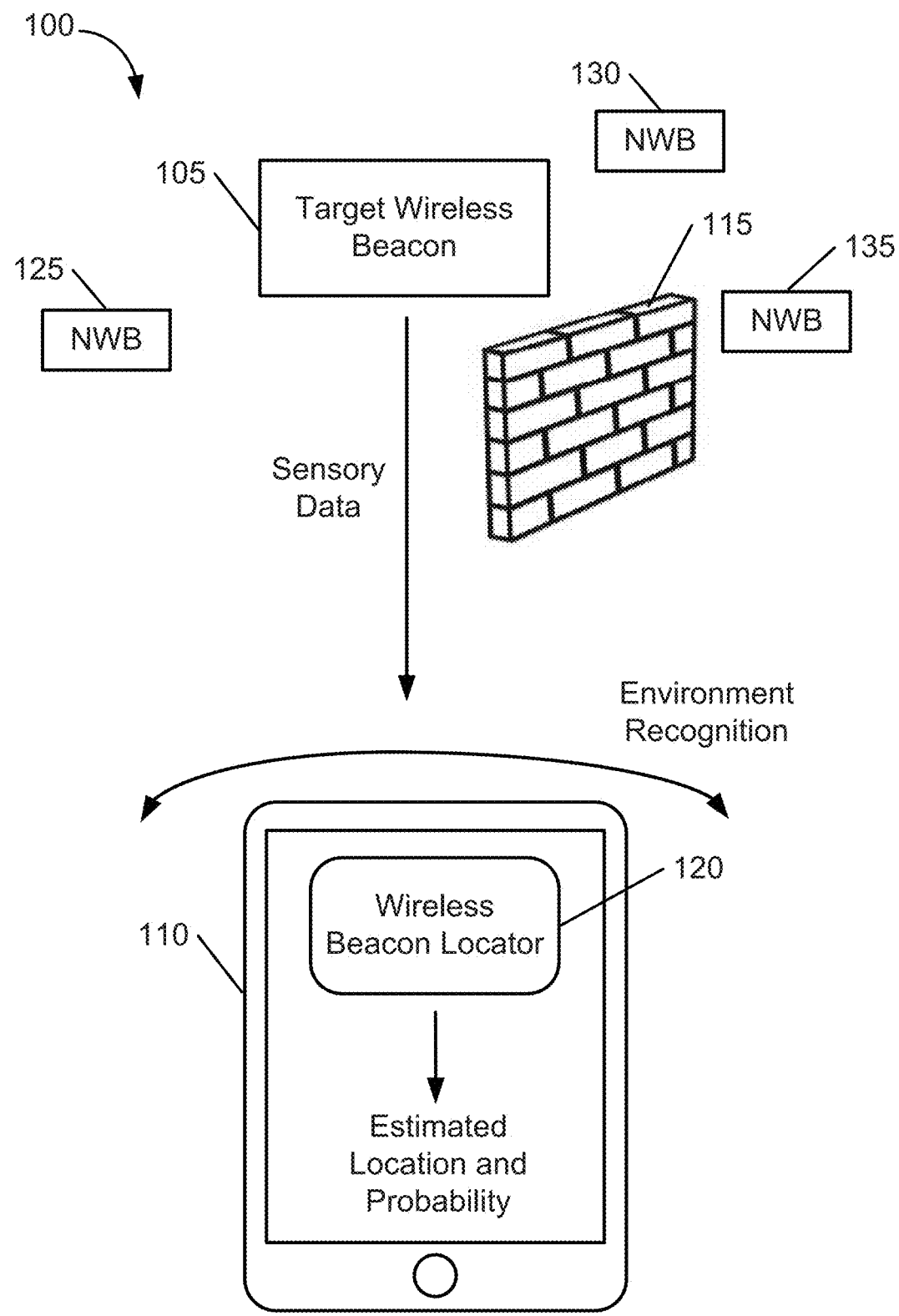
FIG. 1 illustrates a schematic diagram of an environment where a wireless device is used for locating and tracking a wireless beacon in accordance with various examples.

Referring now to FIG. 1, a schematic diagram of an environment where a wireless device is used for locating and tracking a wireless beacon in accordance with various examples is described. Environment 100 may include, for example, a retail store, a hospital, a private home, an open field, or any other physical space in which a wireless beacon is present. A wireless beacon, as generally described herein, is a hardware device capable of broadcasting information over short distances (e.g., within 15 meters) and in accordance with a wireless communications standard (e.g., BLE). Target Wireless Beacon ("TWB") 105 is one such beacon in environment 100. TWB 105 is capable of broadcasting information in a broadcast or beacon signal to nearby devices, such as, for example, wireless device 110. The broadcasted information may include, for example, sensory data such as Received Signal Strength Indicator ("RSSI") data indicating a power level present in the beacon signal.

Wireless device 110 may be any wireless device with wireless communication capabilities, such as, for example, a smartphone, a tablet, a laptop, an Internet of Things ("IoT") device, a headset, a wearable device, an automotive device, or any other wireless compatible device. Wireless device 110 may further include a plurality of sensors and/or determining devices (e.g., an accelerometer, a Global Positioning System ("GPS"), a compass, an altimeter, a magnetometer, an altimeter, a gyroscope, a thermometer, etc.) that are capable of determining and detecting a location or movement of the wireless device 110 and/or characteristics of an environment of the wireless device 110.

In various examples disclosed herein, wireless device 110 has a Wireless Beacon Locator system 120 for estimating a location of a wireless beacon in environment 100, such as, for example, TWB 105. The Wireless Beacon Locator system 120 estimates the location of TWB 105 and a probability (i.e., estimation confidence) of the location based on the sensory data as well as on the environment 100 and determined movements of the wireless device 110 and the TWB 105. Accounting for a type of environment 100 enables the Wireless Beacon Locator system 120 to make more accurate estimations of TWB 105's location as wireless signals are notoriously susceptible to environmental changes and noise, including, for example, obstruction by obstacles such as wall 115. These environmental obstructions cause multipath fading or signal loss, including fluctuating RSSI values. Location accuracy is further improved by refining or calibrating the location estimate to account for Neighboring Wireless Beacons ("NWBs"), such as, for example, NWB 125-135.

Figure 2:
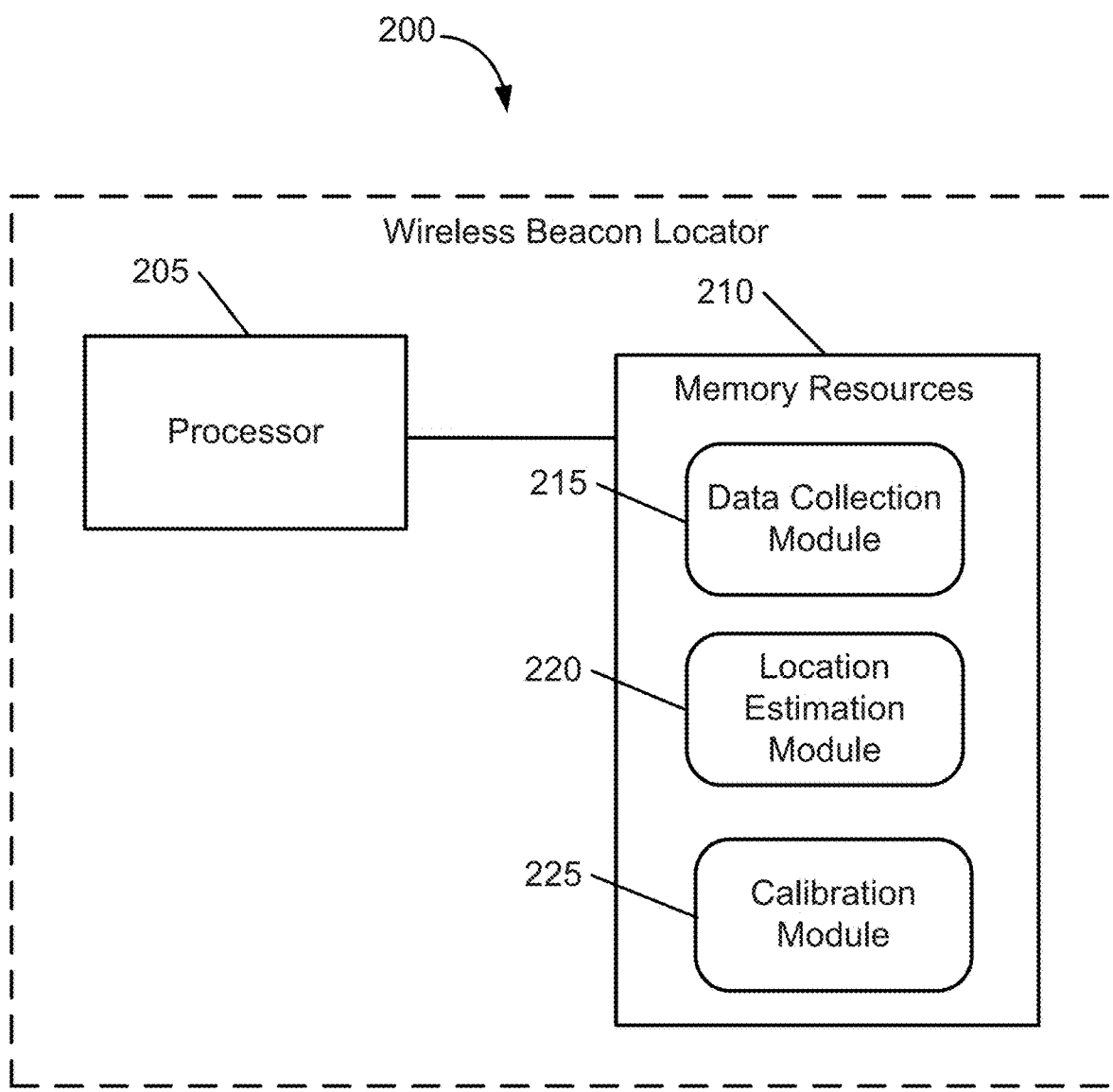
FIG. 2 is a block diagram of an example Wireless Beacon Locator system which may be incorporated into the wireless device of FIG. 1.

Attention is now directed at FIG. 2, which shows a block diagram of an example Wireless Beacon Locator ("WBL") system. WBL system 200 may be, for example, a system in a wireless device, such as WBL system 120 in wireless device 110 of FIG. 1, for locating and tracking a wireless beacon in its vicinity, e.g., TWB 105 of FIG. 1. WBL 200 has a processor 205 and a set of memory resources 210. Processor 205 may include a Central Processing Unit ("CPU"), a Graphics Processing Unit ("GPU"), or another suitable processor. Processor 205 may also include multiple cores or processors. A memory resource, as generally described herein, can include any number of volatile or non-volatile memory components capable of storing instructions that can be executed by a processor. For example, memory resources 210 may include any suitable combination of volatile and/or non-volatile memory, such as combinations of Random Access Memory ("RAM"), Read-Only Memory ("ROM"), memristor memory, spin-transfer torque memory, phase change memory, resistive memory, flash memory, and/or other suitable memory. It is appreciated that memory resources 210 may be integrated in a single device or distributed across multiple devices. Further, memory resources 210 may be fully or partially integrated in the same device as their corresponding processor 205 or they may be separate from but accessible to their corresponding processor 205.

Memory resources 210 store a Data Collection Module 215, a Location Estimation Module 220 and a Calibration Module 225 for WBL 200. It is appreciated that other modules can be added to memory resources 210 for additional or alternative functionality. It is also appreciated that modules may be implemented in a cloud-based environment. Each of the modules 215-225, and any other modules added to memory resources 210, may include computer-readable instructions that configures hardware (e.g., machine or processor-executable instructions, commands, or code such as firmware, programming or object code) to implement the functionalities of the respective module.

Data Collection Module 215 has instructions to collect and process sensory data from a wireless beacon. The sensory data may include, for example, RSSI data. In an example where the wireless beacon is within a BLE-equipped wireless device, the sensory data may also include magnetometer, accelerometer, Inertial Measurement Unit ("IMU") data, and any other data indicating a sensory status (e.g., movement, acceleration, environmental condition) of the wireless beacon. These data may, in one example, be available through the BLE API (e.g., CoreBluetooth in iOS, getBluetoothLeScanner in the Android operating system).

Location Estimation Module 220 has instructions to estimate a location of the wireless beacon. The location is estimated by first classifying an environment surrounding the wireless beacon based on the sensory data collected by the Data Collection Module 215. The environment classification, described in more detail herein below, ensures that the estimated location is adapted to environmental changes. For example, if a wireless beacon is in movement while its location is being estimated, the location estimate may be susceptible to fading or path loss as a result of potential obstructions in the physical environment. Classifying the environment enables the WBL system 200 to be adaptive to dynamic signal propagation environments by learning environmental changes directly from RSSI data received from wireless beacons.

Upon classifying the environment, the Location Estimation Module 220 detects whether the wireless beacon and the wireless device are moving. As described in more detail herein below, detecting a movement of the wireless device involves requesting a user of the wireless device to walk a short distance (e.g., 3.5-5 meters) in a geometrical (e.g., L-shaped) path and determining the moving direction and distance traveled by the wireless device in real-time by acquiring motion sensor data. The location of the wireless beacon is then estimated based on the sensory data, the classified environment and the determined movements of the wireless device and the wireless beacon. As further described in more detail below, the Calibration Module 225 refines the location of the wireless beacon estimated by the Location Estimation Module 220 with a clustering technique that accounts for RSSI data from multiple clustered neighboring beacons.

Figure 3:
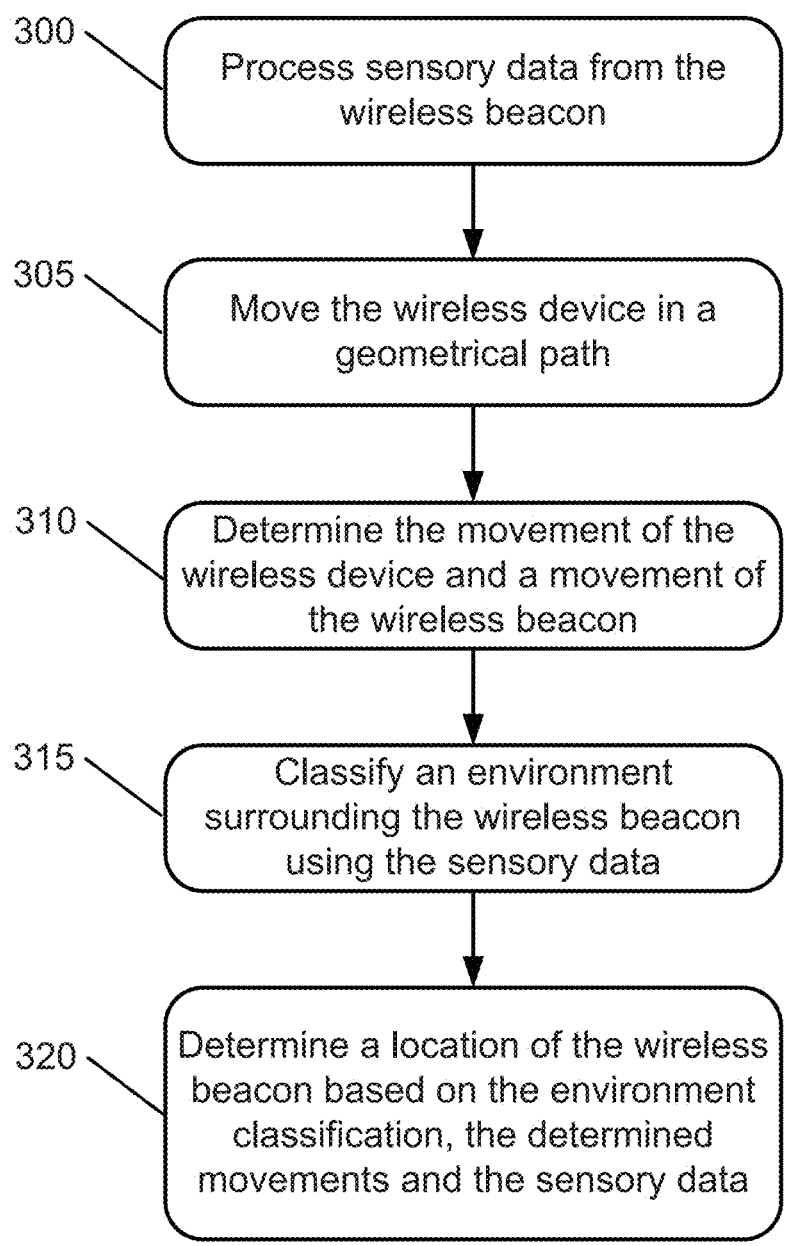
FIG. 3 is a flowchart implemented in a wireless device for locating and tracking a wireless beacon in accordance with various examples.

Referring now to FIG. 3, a flowchart implemented in a wireless device for locating and tracking a wireless beacon in accordance with various examples is described. First, sensory data from the wireless beacon is processed at the wireless device (300). The sensory data may include for example, RSSI data. In the case where the wireless beacon is within a BLE-equipped wireless device, the sensory data may also include magnetometer, accelerometer, IMU data, and so on. Next, the wireless device is requested to move in a geometrical path (305). In various examples, the geometrical path is an L-shape path over a short distance (e.g., 3.5-5 meters) to handle ambiguities with regards to the location of the wireless beacon. The movement of the wireless device and a movement of the wireless beacon are then determined using motion sensors in the devices (310). It is appreciated that the wireless beacon may be a stationary beacon so no movement is detected. It is also appreciated that a moving wireless beacon is a moving BLE-equipped device (e.g., a smartphone) also having motion sensors capable of detecting such movement. Any detected movement of the wireless device is matched to RSSI data in the sensory data with a timestamp.

Next, an environment surrounding the wireless beacon is classified using the sensory data (315). The environment classification, as described in more detail below, involves collecting training data in a set of environment types with a classifier such as a Support Vector Machine ("SVM") with a linear kernel. The environment types may include, for example, a line-of-sight ("LOS") environment, a partial-line-of-sight ("pLOS") environment, and a non-line-of-sight ("NLOS") environment types, among others. Lastly, the location of the wireless beacon is determined based on the environment classification, the determined movements and the sensory data (320). The location is determined by solving a reverse regression described in more detail below.

Figure 4:
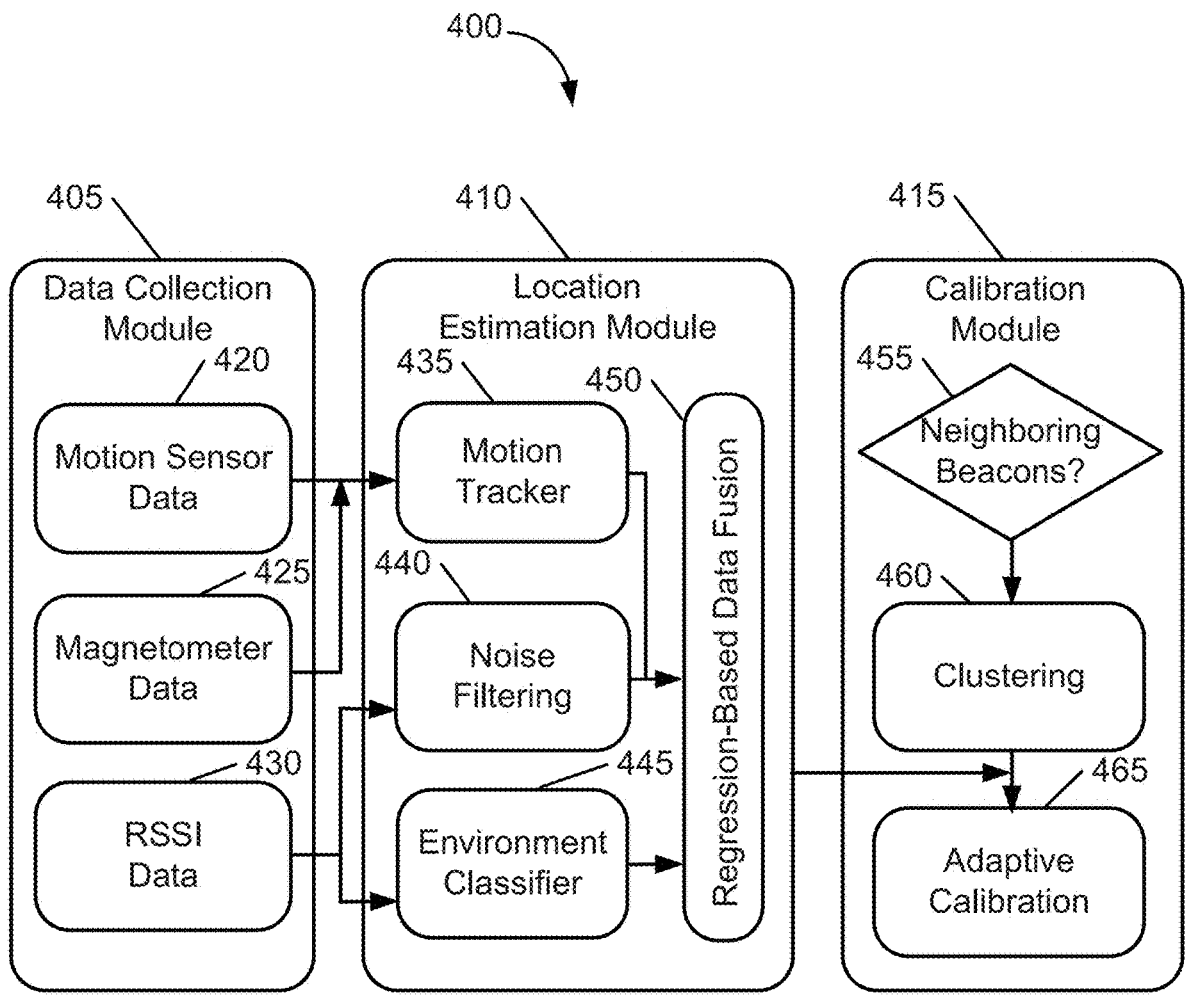
FIG. 4 is a schematic diagram of the modules of the Wireless Beacon Locator system of FIG. 2 in accordance with various examples.

Attention is now directed to FIG. 4, which shows modules of an example WLB system in additional detail. WLB system 400, similar to WLB system 200 and 120, has a Data Collection Module 405, a Location Estimation Module 410 and a Calibration Module 415. Data Collection Module 405 collects and processes sensory data from the wireless beacon as well as from the wireless device. The sensory data may include motion sensor data (420) and magnetometer data (425) from both the wireless beacon and the wireless device and RSSI data (430) from the wireless beacon. Data 420-430 is collected periodically by the Data Collection Module 405 within a given time window.

Figure 5:
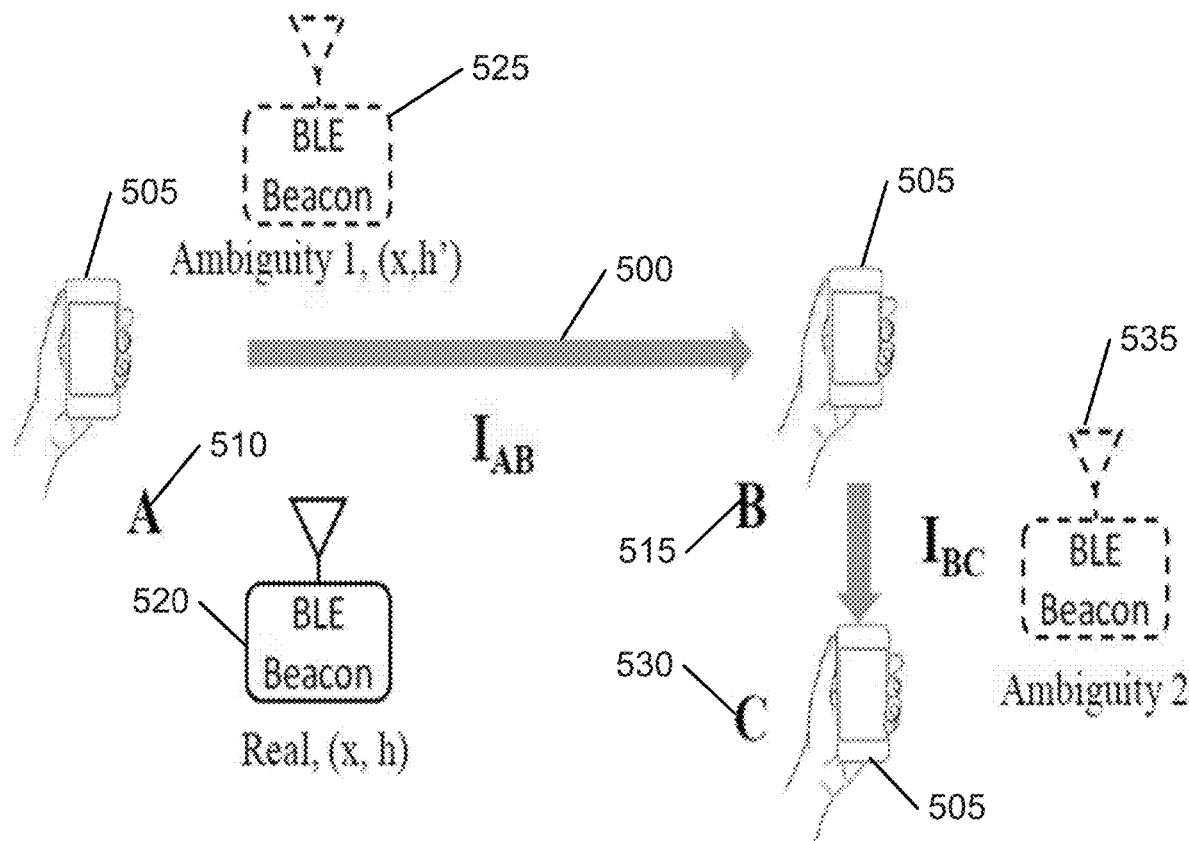
FIG. 5 illustrates an example geometrical path movement of the wireless device.

The motion sensor data (420) and the magnetometer data (425) collected for the wireless device are collected upon the wireless device moving in a geometrical path. Motion Tracker 435 in Location Estimation Module 410 instructs the wireless device to move in a geometrical path and determines such movement. FIG. 5 illustrates an example geometrical path movement of the wireless device. In various examples, the geometrical path is an L-shape path over a short distance (e.g., 3.5-5 meters) to handle ambiguities with regards to the location of the wireless beacon that arise from the regression estimation of the location, as described in more detail below. Suppose the real location of the wireless beacon is at one side of trace AB at 500. The wireless device 505 starts moving from point A 510 to point B 515. Processing sensory data from the wireless beacon to determine its location would result in two potential locations: real location 520 and potential location 525. To resolve this ambiguity, the wireless device 505 continues to move with a different angle from point B 515 to point C 530. With this movement, there is another ambiguity with potential location 535.

In order to resolve the ambiguities, the Location Estimation Module 410 determines multiple potential locations for the wireless beacon and combines them. To determine the moving direction and distance of the wireless device in real-time, the motion sensor data 420 of the wireless device is transformed to Earth coordinates using a coordinate alignment. The moving distance of the wireless device is determined from accelerometer readings for step count. For determining turning (e.g., turning from point B 515 to point C 525), the Motion Tracker 435 uses gyroscope and magnetometer data 425 for tracking the degrees of turn.

Referring back to FIG. 4, the Location Estimation Module 410 receives the RSSI data 430 collected from the wireless beacon at Data Collection Module 405 and filters the RSSI data 430 in Noise Filtering 440 to remove noise, which may be caused by environmental degradation or properties of analog components used in the wireless beacon, imperfections, temperature changes, and so on. Noise Filtering 440 is based on two noise filtering techniques: (1) a fine-tuned Butterworth Filter ("BF"); and (2) an Adaptive Kalman Filter ("AKF"). To remove the effect of fast fading caused by environmental changes and device movements, the RSSI data 430 is first filtered through a low-pass filter based on a $6^{th}$ order BF. The BF is very effective at smoothing fluctuating RSSI data 430. However, the high $6^{th}$ order of the BF introduces delay and undermines the responsiveness of filtered data. To mitigate the impact of delay, the RSSI data 430 is filtered through an AKF. The AKF enhances the responsiveness of the filter by fusing the raw RSSI data 430 with filtered RSSI data output by the BF.

The Location Estimation Module 410 classifies the environment surrounding the wireless beacon with Environment Classifier 445. As RSSI data can be affected by environmental changes during data collection by Data Collection Module 405, the Environment Classifier 445 recognizes environmental changes and helps the location estimation performed by the Location Estimation Module 410 to adapt to those changes and yield more accurate estimation results. In one example, the Environment Classifier 445 classifies the environment into three types: (1) LOS; (2) pLOS; and (3) NLOS. The classification is performed by collecting a set of training data over a series of time windows. RSSI data is collected periodically over short time windows (e.g., 1-2 s) and in different variations of the three environment types. For example, for the NLOS environment, wireless beacons are placed behind various blocking objects (e.g., a wall, human body, etc.) while the data is collected.

A feature vector including the statistics of mean, variance and skewness is formed for each time window. Additional statistics of minimum, first quartile, median, third quartile, and maximum values are computed to form a feature vector having these 9 statistics. The training data of feature vectors may be tested in multiple classifiers, including: (1) an SVM with multiple kernels; (2) a Decision Tree Classifier; and (3) a Random Forest Classifier. Experimental results over a large training set showed that an SVM classifier using a linear kernel yielded the most accurate results, with over 94% accuracy. It is appreciated that the disclosed examples may be implemented with various environment types and classifiers and are not limited to the illustrated examples.

Lastly, the Location Estimation Module 410 determines the location of a wireless beacon based on the environment classification, the determined movements and the sensory data. The location is determined together with a probability of the location (i.e., estimation confidence) in a Regression-Based Data Fusion 450 based on data fusion of RSSI data and motion data. In case the wireless beacon is stationary, the Location Estimation Module 410 performs the location estimation directly in the wireless device. For location estimation of a moving target, i.e., in the case the wireless beacon is within a BLE-equipped wireless device, the Location Estimation Module 410 requires data transmission between the wireless device and the wireless beacon. In various examples, the WBL system 400 has two operational modes (e.g., for stationary or moving wireless beacons) and enables users of the wireless device running the WBL system 400 to select the desired mode.

Figure 6A:
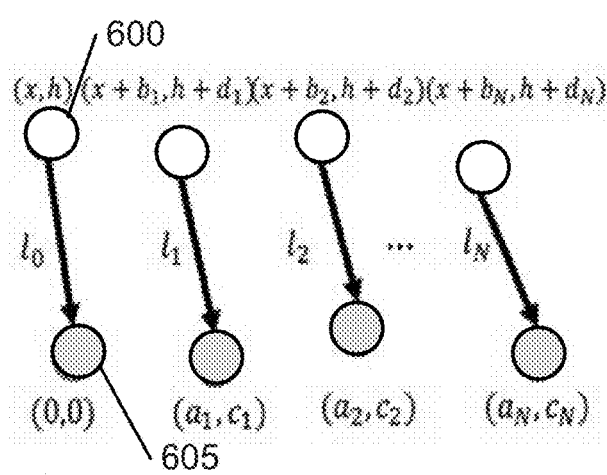
FIG. 6A is a schematic diagram showing a moving wireless beacon relative to a moving wireless device in accordance with various examples.
Figure 6B:
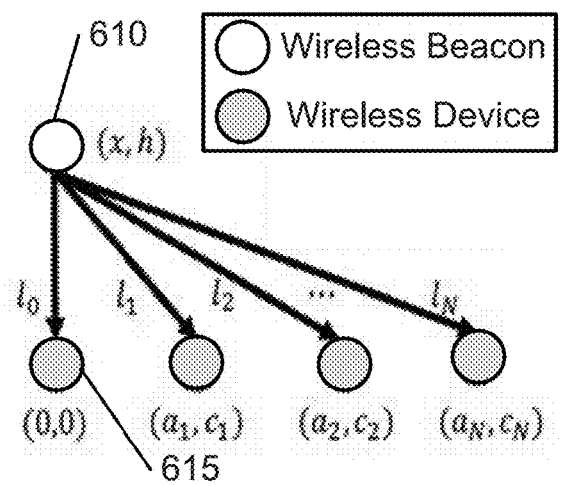
FIG. 6B is a schematic diagram showing a stationary wireless beacon relative to a moving wireless device in accordance with various examples.

FIGS. 6A and 6B illustrate the different modes. In FIG. 6A, a wireless beacon 600 is moving relative to a moving wireless device 605. In FIG. 6B, a wireless beacon 610 is stationary relative to a moving wireless device 615. Consider a coordinate plane with the origin as the wireless device's starting point and the x-axis as the wireless device's starting direction. The goal of the Regression-Based Data Fusion 450 is to estimate the wireless beacon's relative location (x, y) in this coordinate plane. With accurate tracking of the movement for both the wireless device and the wireless beacon, the wireless device's real-time x and y movements can be represented by $(a_i, c_i)$, while the wireless beacon's relative x and y movements can be represented by $(b_i, d_i)$, where $i \in [0, N]$, and N is the total number of data points sampled within a given time window. It is noted that $a_0=0$, $b_0=0$, $c_0=0$ and $d_0=0$. The corresponding distance $l_i$ can then be determined as:

$$l_i = \sqrt{(x+b_i-a_i)^2+(h+d_i-c_i)^2} \quad \text{(Eq. 1)}$$

Using a path-loss model, the filtered RSSI data coming from Noise Filtering 440 is combined with the determined movements from Motion Tracker 435 as follows:

$$\begin{cases} RSSI = \Gamma(e) - 10n(e)\log(l_i) \\ l_i^2 = (x+b_i-a_i)^2 + (h+d_i-c_i)^2 \end{cases} \quad \text{(Eq. 2)}$$

where $\Gamma(e)=P+X(e)$, P denotes a power offset that depends on the hardware configuration of the wireless beacon, $X(e)$ indicates environment noise, $n(e)$ is a fading coefficient that varies with the environment, and e denotes environmental changes.

Simplifying the notation, let $$\epsilon = \exp\left(\frac{\Gamma(e)}{5n(e)}\right), \eta = \exp\left(\frac{-1}{5n(e)}\right)$$

and $p_i=b_i-a_i$, $q_i=d_i-c_i$, the second equation of Eq. 2 can be rewritten as:

$$p_i^2+q_i^2+2xp_i+2hq_i+x^2+h^2=\epsilon\eta^{RSSI_i} \quad \text{(Eq. 3)}$$

It is noted that as Eq. 3 has a similar form to an elliptical regression problem, it can be rewritten as:

$$Ap^2+B\,q^2+Cp+Dq+G=\rho \quad \text{(Eq. 4)}$$

where $$A=\frac{1}{\epsilon}, B=\frac{1}{\epsilon}, C=\frac{2x}{\epsilon}, D=\frac{2h}{\epsilon}, G=\frac{x^2+h^2}{\epsilon}$$

and $p=\eta^{RSSI_i}$. These parameters can be derived based on a least squares regression, as follows:

$$P=(X^TX)^{-1}X^TY \quad \text{(Eq. 5)}$$

where $P=[1, A, B, C, D, G]'$ is the parameter vector, $X=[1, p^2, pq, q^2, p, q]$ is the data matrix and $Y=[\rho]$ is the output vector.

In case both the wireless device and the wireless beacon are moving randomly such as with the wireless device 605 and the wireless beacon 600 in FIG. 6A, the wireless device and the wireless beacon communicate with each other. Specifically, after collecting sensory data, the wireless beacon sends the data to the wireless device for processing. If the wireless beacon remains stationary, as is the case of wireless beacon 610 in FIG. 6B, the location estimation problem becomes much simpler, with q=0.

It is appreciated that $n(e)$ cannot be derived explicitly because the output variable $\eta$ also contains $n(e)$. So the Location Estimation Module 410 determines $n(e)$ numerically by finding $\hat{\eta}^*(e)$ as follows:

$$\hat{n}^*(e) = \underset{\hat{n}(e)}{\arg\min}\left(\left(\mathbb{L}(\hat{x}, \hat{h}) - \mathbb{R}(n(e), \Gamma(e))\right)^2\right) \quad \text{(Eq. 6)}$$

where $\mathbb{L}(\cdot)$ and $\mathbb{R}(\cdot)$ are the left and right sides of Eq. 4, respectively. By solving Eq. 6, the location for a wireless beacon for both the stationary (FIG. 6B) and moving (FIG. 6A) cases can be estimated. Thus, the coordinates $\hat{x}$ and $\hat{h}$ can be derived from the elliptical regression formulated above.

It is noted that a signal propagation model can be expressed as: RSSI=$\Gamma(e)+\delta(e)-10n(e)\log(d)$, with $\delta(e)$ indicating noise. With the actual/estimated coefficients $n(e)$ and $\Gamma(e)$, the noise $\delta(e)$ can be calculated for every RSSI data point by subtracting the estimated RSSI ($\overline{RSSI}$) from the original RSSI(RSSI), i.e., $\delta(e)=RSSI(RSSI)-RSSI(\overline{RSSI})$. Ideally, $\delta_{RSSI}$ follows a Gaussian distribution with 0 mean. However, in reality, $\delta_{RSSI}$ will not have a 0 mean. Assume $\delta_{RSSI}$'s mean and standard deviation are $\mu$ and $\sigma$, respectively. Mathematically, Gaussian distribution's $\sigma$ is robust to the change of its mean, so it can be assumed that $\sigma$ remains the same and the original Gaussian noise follows $N(0, \sigma)$. Therefore, $P(\mu)$ can be treated as a probability (i.e., estimation confidence), where $P(x)$ follows $N(0, \sigma)$.

Figure 7A:
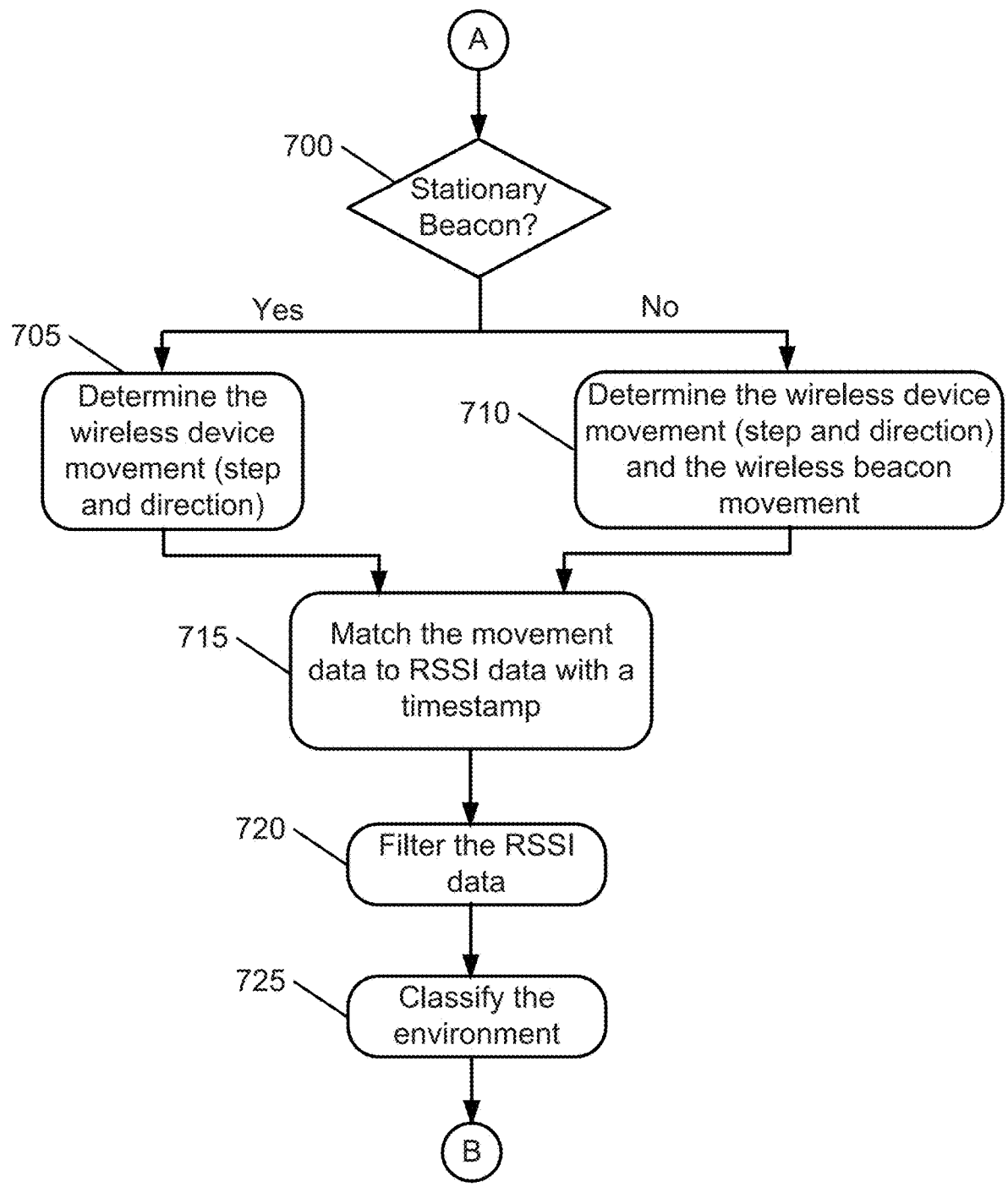
FIGS. 7A-B illustrate a flowchart implemented by the Location Estimation Module of FIG. 4 in accordance with various examples.
Figure 7B:
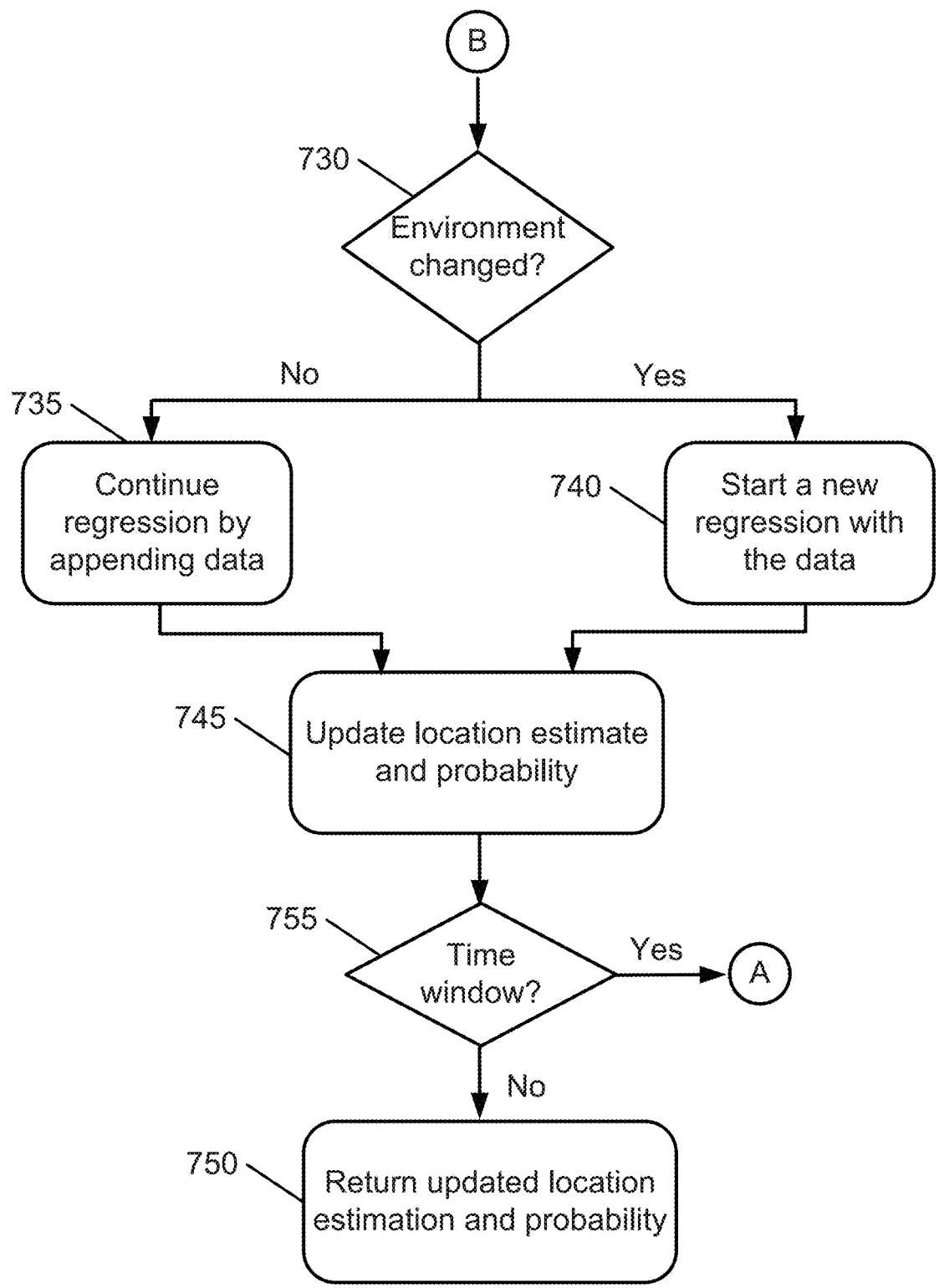

FIGS. 7A-B illustrate the steps outlined above and implemented in the Location Estimation Module 410 of FIG. 4 in accordance with various examples. Starting in FIG. 7A and within a time window for collecting data from a wireless beacon, a determination is made as to whether the wireless beacon is moving or stationary (700). If the wireless beacon is stationary, then the wireless device is requested to move in a geometrical path (e.g., an L-shape path as described above with reference to FIG. 5) and its movement (step and direction) is determined (705). If the wireless beacon is itself in movement, then both the wireless device movement and the wireless beacon movement are determined (710). Next, the movement data is matched with collected RSSI data from the wireless beacon with a timestamp (715). The matching is performed to ensure data consistency and integrity with the timestamp.

Once the match is performed, the RSSI data is filtered for noise (720). In various examples, the filter is based on two noise filtering techniques: (1) a fine-tuned BF; and (2) an AKF as described above with reference to Noise Filtering 440 in FIG. 4. Next, the environment is classified (725). Any environment classification may be used, including, for example, the Environment Classifier 445 described above with reference to FIG. 4.

Moving on to FIG. 7B, a determination is made as to whether there was a change in environment (730). This could be the case, for example, when the wireless beacon moves from a LOS to a NLOS environment, or any other change in environment that may affect data collection and the ability to determine an accurate location for the wireless beacon. If the environment has not changed from a previous data sample processed within the time window, the regression to estimate the wireless beacon's location and probability is continued by appending data collected within the time window (735). If the environment has changed (including for the first data collection within the time window), then a new regression is started (740). Solving the regression results in an updated location estimate and probability (745) that are then returned (750) at the end of the time window (755). If the time window has not yet expired, then the steps 700-750 are repeated.

With the location and probability estimated, the next step is to calibrate the estimation to account for valuable information from potential neighboring wireless beacons. Attention is again directed at FIG. 4, which shows a Calibration Module 415. Calibration Module 415 first recognizes whether there are multiple neighboring wireless beacons nearby (455), and if so, the estimated location is refined with a Clustering sub-module 460 and an adaptive calibration 465 based on RSSI data from the multiple neighboring wireless beacons.

Figure 8A:
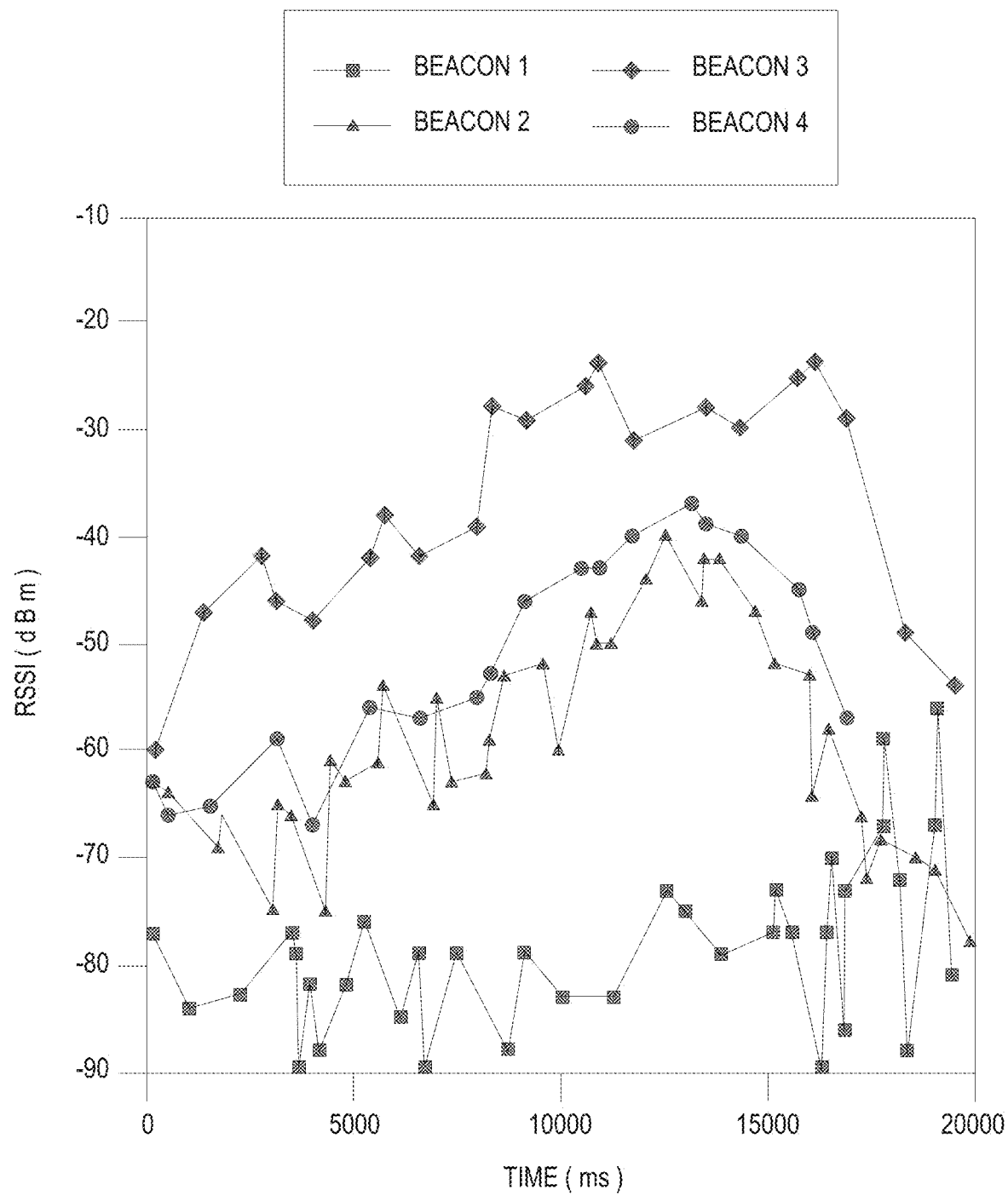
FIGS. 8A-D are graphs illustrating the Clustering of FIG. 4.

As neighboring devices are usually unknown to each other beforehand, Clustering sub-module 460 aims to group them based only on collected RSSI data. In one illustrated example shown in FIGS. 8A-D, Clustering sub-module 460 collects RSSI data for four neighboring beacons, including a target wireless beacon for which the location is to be estimated. FIG. 8A shows RSSI sequences of one measurement, in which beacon 4 is the target wireless beacon (e.g., 5 m away from the wireless device measuring its location). Beacons 2 and 3 stay close (e.g., 0.3 m between them) to the target wireless beacon, and beacon 1 is not nearby (e.g., 4 m away). Beacons 2 and 3 are shown to exhibit a similar pattern of RSSI changes. Since the measurement requires the wireless device estimating the location of the target wireless beacon to make a geometrical (e.g., L-shape) movement, such a pattern becomes unique in geometry. Further, the target RSSI frequency in this case is found to drop from 8 Hz to around 3 Hz due to interference.

To capture this unique trend of RSSI readings and cluster beacons 2, 3, and 4 together, Clustering sub-module 460 adapts an implementation of a Dynamic Time Warping ("DTW") algorithm. It is appreciated that DTW is, in general, used to align and measure the similarity between two temporal sequences of data. It formulates a cost matrix based on an Euclidean distance between two datasets and then picks the path with the lowest cost as an alignment path. It is noted that there are three challenges in using DTW to accurately match RSSI sequences from neighboring beacons with the target wireless beacon sequence: (1) different devices may have different sensor sampling frequencies and may sense different signal amplitudes due to chipset and environment variations; (2) DTW has high time complexity (O(n2)), which is not suitable for large data sequence matching; and (3) possible significant noise in a data sequence may lead to incorrect matching for the data sequence.

Figure 8B:
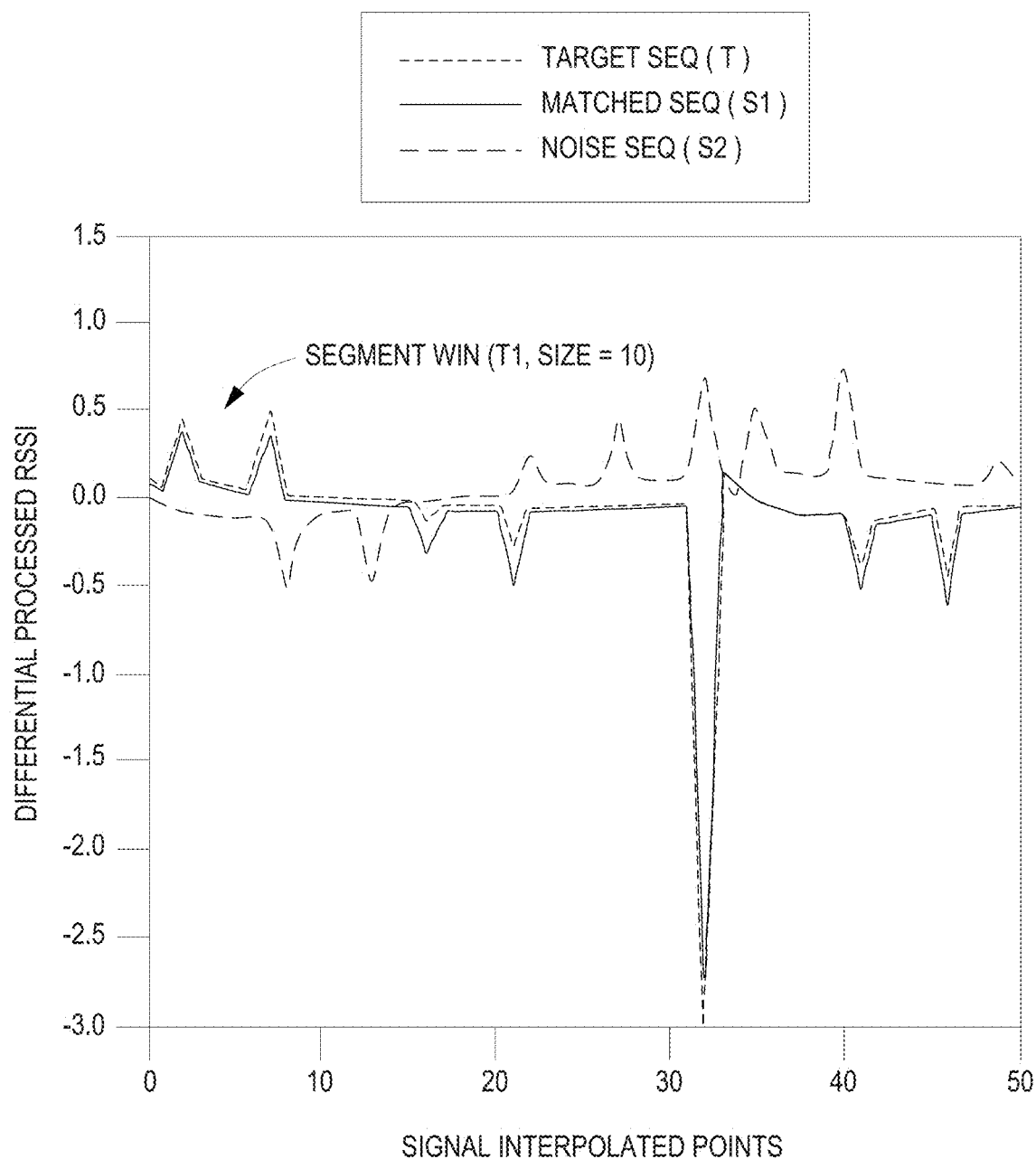

Clustering sub-module 460 ameliorates these challenges by using a fixed window DTW voting algorithm. First, to deal with device heterogeneity and environment diversity, Clustering sub-module 460 filters out high-frequency noises, and then differentiates the RSSI sequences from the neighboring beacons to avoid using absolute values. Second, the computation overhead is reduced by dividing a large data sequence into small data segments and utilizing a lower bounding technique. FIG. 8B shows results for a segmentation of RSSI sequences for wireless beacons 4, 3, and 1. The RSSI sequence collected for the target wireless beacon is denoted as T, the RSSI sequence collected for the neighboring wireless beacon 3 is denoted as S1, and the RSSI sequence collected for the neighboring wireless beacon 1 is denoted as S2. To perform the data segmentation, T is first divided into equal-length segments. In various examples, a segment length of 10 data points may yield the best tradeoff between accuracy and computation complexity. The other neighboring RSSI sequences are then split according to $T_i$'s timestamp and interpolated to match T's segments.

Figure 8C:
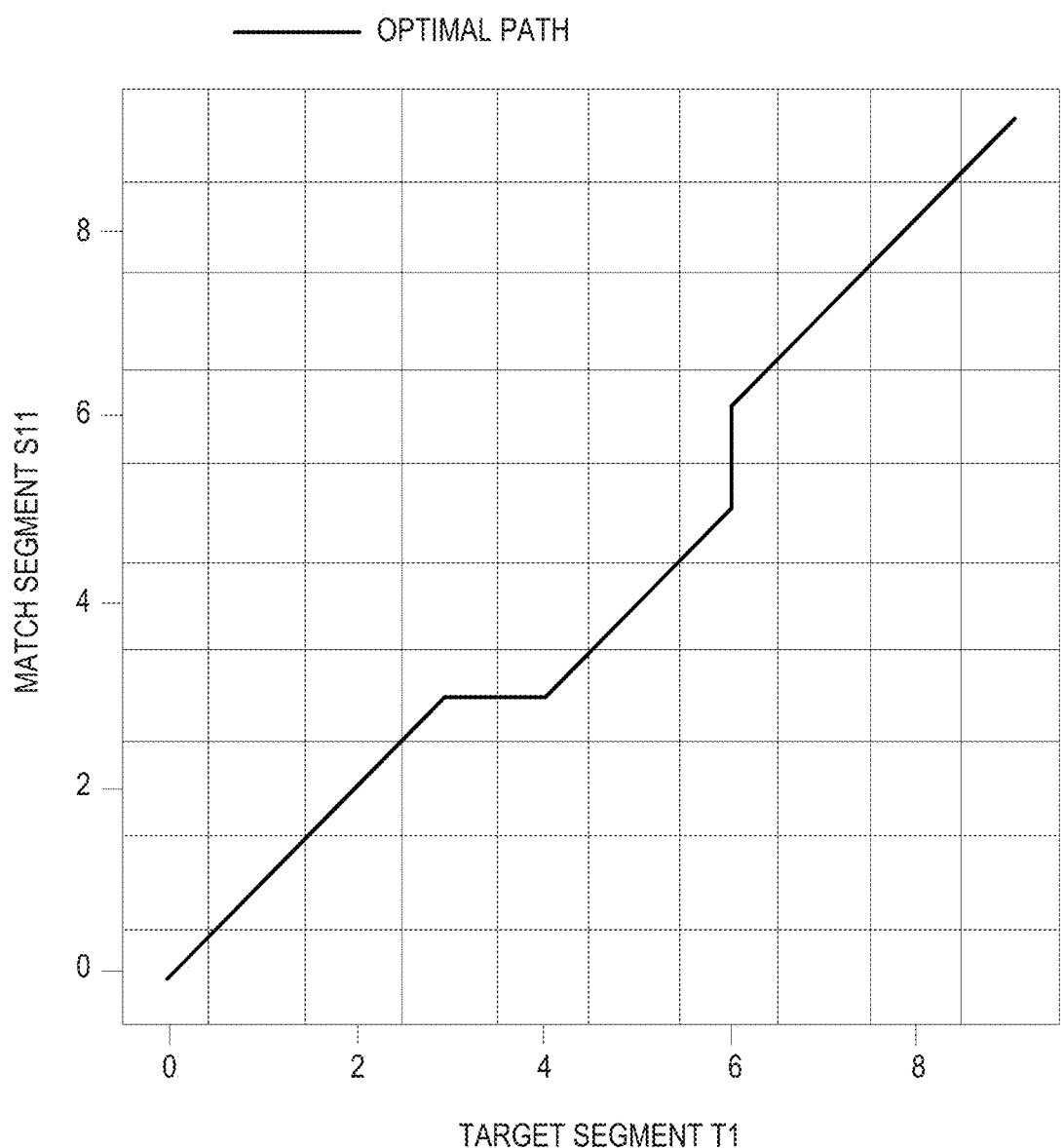
Figure 8D:
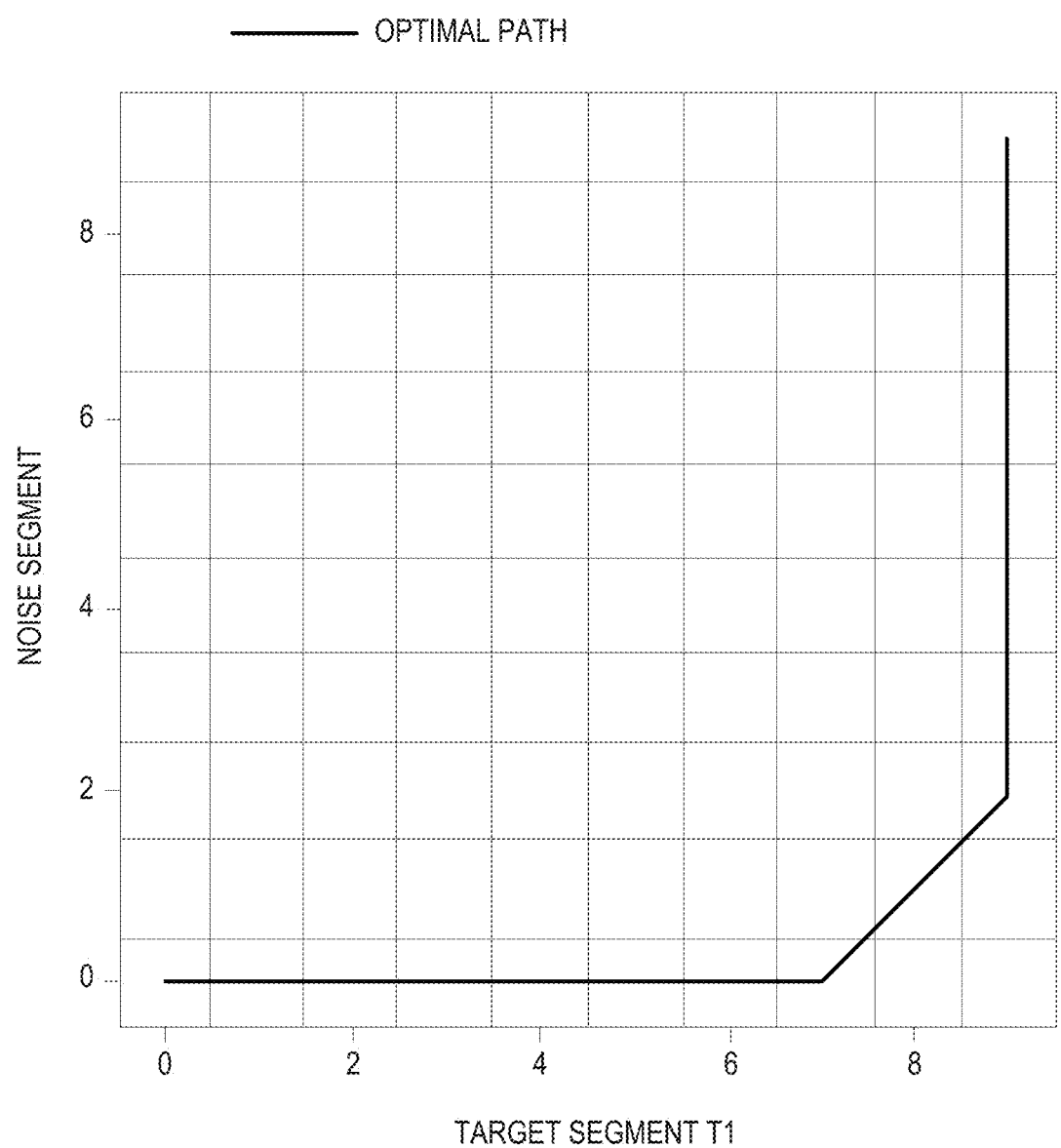

The data segments for the neighboring wireless beacons are illustrated in FIG. 8B. Each segment is validated with the lower bounding technique. A bounding envelope is created above and below each target segment using a warping window. Then, the squared sum of the distances from every part of a segment not falling within the bounding envelope is computed to the nearest orthogonal edge of the bounding envelope, and checked to see if it is less than a threshold. In various examples, an empirical threshold set for the segment of 10 data points batch is 6.1, which is the same as a DTW similarity threshold. Only valid data segments can be passed to the DTW similarity matching. It is noted that this lower bound testing is 100× faster than DTW computing for the same size data. FIG. 8C shows the successful matching for neighboring wireless beacon 3, and FIG. 8D shows an unsuccessful matching for neighboring wireless beacon 1.

It is appreciated that this clustering scheme 460 is found to be at least 2× faster than applying DTW directly to the original RSSI sequences. Finally, to obtain the final matching result, straightforward voting is implemented. For every RSSI sequence, each segment is determined to be successful or unsuccessful based on the above DTW matching. A neighboring RSSI sequence is found to match successfully by checking more than a half of the sequence's segments to match the target wireless beacon segment.

Once the clustering is complete, Adaptive Calibration 465 in FIG. 4 is performed to calibrate the wireless beacon location according to its neighbors. Suppose there are N candidate wireless beacon locations with probability $p_i$ for each candidate i. The calibrated position is computed by determining the normalized weight $p_i/(\Sigma_{j=1}^{N} p_j)$ and then determining the weighted sum of the candidate positions as the final location estimate.

Figure 9:
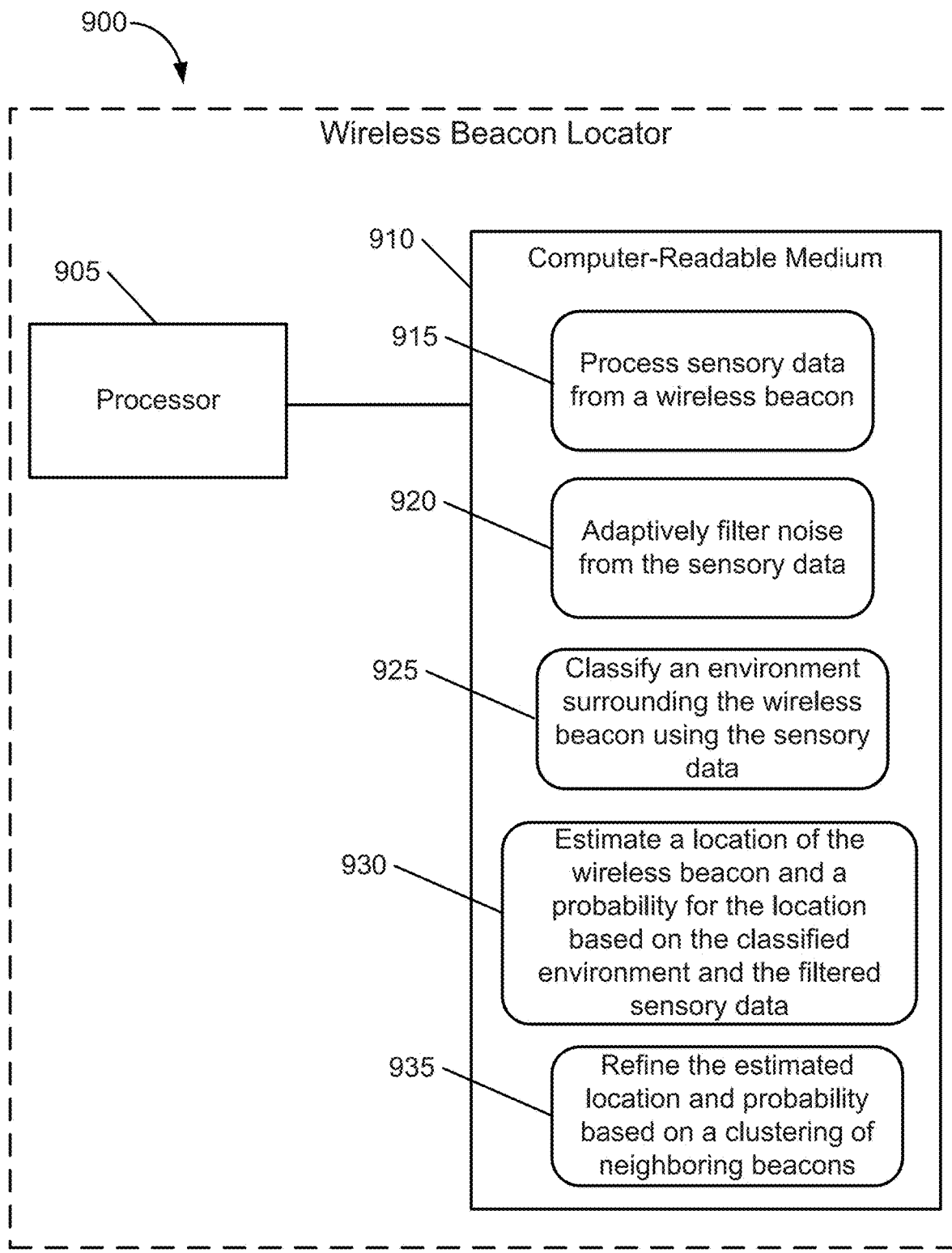
FIG. 9 is a schematic diagram of a system for locating and tracking a wireless beacon from a wireless device and in accordance with various examples.

Attention is now directed to FIG. 9, a schematic diagram of a system for locating and tracking a wireless beacon from a wireless beacon in accordance with various examples is described. Wireless Beacon Locator system 900 includes a processor 905 and a tangible, non-transitory computer-readable medium 910 storing instructions 915-935 that are executed by the processor 905. Computer-readable medium 910 can include volatile and/or non-volatile memory such as Random Access Memory ("RAM"), magnetic memory such as a hard disk and/or tape memory, a Solid State Drive ("SSD"), flash memory, phase change memory, memristive memory, and so on. In various examples, Wireless Beacon Locator system 900 may be implemented in a wireless device, such as a smartphone, tablet, wearable device, headset, and so on.

Instructions 915 include instructions to process sensory data (e.g., RSSI data) from a wireless beacon to be located. The data is broadcast from the wireless beacon to the wireless device, and may also include motion sensor, magnetometer, accelerometer, or other data in the case the wireless beacon is within a BLE-equipped device. Instructions 920 include instructions to filter noise from the sensory data. In various examples, noise filtering is accomplished with an Adaptive Kalman Filter in Noise Filtering sub-module 440 of FIG. 4. The environment surrounding the wireless beacon is classified using the sensory data with instructions 925 and as described above with reference to Environment Classifier 445 of FIG. 4. Lastly, instructions 930 include instructions to estimate a location of the wireless beacon and a probability for the location based on the classified environment and the filtered sensory data using, for example, a reverse regression. The estimated location and probability are refined based on a clustering of neighboring beacons with instructions 935. Additional instructions not shown in FIG. 9 may include instructions to determine a movement of the wireless device and a movement of the wireless beacon, and match the movement of the wireless beacon to RSSI data in the sensory data with a timestamp. It is noted that the instructions above result in accurate location estimates for wireless beacons by taking into account the surrounding environment and recognizing that RSSI data is subject to noise.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system in a wireless device for locating and tracking a wireless beacon, comprising:
   a processor;
   a set of memory resources storing a set of modules executable by the processor, the set of modules comprising:
   a data collection module to collect and process sensory data from the wireless beacon, wherein the sensory data indicates a sensory status of the wireless beacon;
   a location estimation module to:
   classify an environment surrounding the wireless beacon into one of a plurality of environment types each having differing signal propagation characteristics based on the sensory data;
   determine a movement of the wireless device and a movement of the wireless beacon;
   estimate a location of the wireless beacon based on the sensory data, the classified environment, the determined movement of the wireless device and the determined movement of the wireless beacon; and
   a calibration module to refine the location of the wireless beacon based on neighboring wireless beacons by:
   collecting Received Signal Strength Indicator (RSSI) data associated with each of the neighboring wireless beacons as the wireless device is moving;
   grouping a subset of the neighboring wireless beacons that exhibit a similar pattern of RSSI changes into a cluster; and
   calibrating the location of the wireless beacon based on RSSI data from the cluster.

2. The system of claim 1, wherein the wireless beacon is a Bluetooth Low Energy ("BLE") beacon.

3. The system of claim 1, wherein the sensory data comprises at least one of motion sensor data, magnetometer data, and Received Signal Strength Indicator ("RSSI") data.

4. The system of claim 1, wherein the location estimation module to classify an environment surrounding the wireless beacon comprises the location estimation module to collect environmental training data and classify the environment with a Support Vector Machine ("SVM") classifier using a linear kernel and the sensory data.

5. The system of claim 4, wherein the environment is classified into one of a line-of-sight ("LOS") environment, a partial-line-of-sight ("p-LOS") environment, or a non-line-of-sight ("NLOS") environment.

6. The system of claim 1, wherein the location estimation module to determine a movement of the wireless device and a movement of the wireless beacon comprises the location estimation module to determine whether the wireless beacon is moving, and upon determining that the wireless beacon is moving, the location estimation module to determine an L-shaped movement of the wireless device.

7. The system of claim 3, wherein the location estimation module to estimate a location of the wireless beacon based on the sensory data, the classified environment, the determined movement of the wireless device and the determined movement of the wireless beacon comprises the location estimation module to solve a reverse regression based on data fusion of the sensory data.

8. The system of claim 7, wherein the location estimation module to estimate a location of the wireless beacon comprises the location estimation module to filter the RSSI data with an Adaptive Kalman Filter prior to solving the reverse regression.

9. A method implemented in a wireless device for locating and tracking a wireless beacon, comprising:
   processing sensory data from the wireless beacon, wherein the sensory data indicates a sensory status of the wireless beacon;
   moving the wireless device in a geometrical path;
   determining the movement of the wireless device and a movement of the wireless beacon;
   classifying an environment surrounding the wireless beacon into one of a plurality of environment types each having differing signal propagation characteristics using the sensory data;
   determining a location of the wireless beacon based on the environment classification, the determined movements and the sensory data; and
   calibrating the location of the wireless beacon based on the clustering of a subset of neighboring wireless beacons, including:
   collecting Received Signal Strength Indicator (RSSI) data associated with each of the neighboring wireless beacons as the wireless device is moving;
   responsive to identifying the subset of neighboring wireless beacons exhibit a similar pattern of RSSI changes, grouping the subset of neighboring wireless beacons into a cluster; and
   calibrating the location of the wireless beacon based on RSSI data from the cluster.

10. The method of claim 9, further comprising matching the movement of the wireless beacon to RSSI data with a timestamp.

11. The method of claim 9, wherein classifying an environment surrounding the wireless beacon comprises classifying the environment with a Support Vector Machine ("SVM") classifier using a linear kernel and the sensory data.

12. The method of claim 9, wherein determining a location for the wireless beacon comprises estimating the location and a probability for the location by solving a reverse regression.

13. The method of claim 12, comprising restarting a new reverse regression if the environment surrounding the wireless beacon changes.

14. A non-transitory computer readable medium comprising instructions executable by a processor to:
   process sensory data from a wireless beacon, wherein the sensory data indicates a sensory status of the wireless beacon;
   adaptively filter noise from the sensory data;
   classify an environment surrounding the wireless beacon into one of a plurality of environment types each having differing signal propagation characteristics using the sensory data;
   estimate a location of the wireless beacon and a probability for the location based on the classified environment and the filtered sensory data; and refine the estimated location and probability based on a clustering of neighboring wireless beacons by:

collecting Received Signal Strength Indicator (RSSI) data associated with each of the neighboring wireless beacons as the wireless device is moving;

grouping a subset of the neighboring wireless beacons that exhibit a similar pattern of RSSI changes into a cluster; and calibrating the location of the wireless beacon based on RSSI data from the cluster.

15. The non-transitory computer readable medium of claim 14, wherein to adaptively filter noise from the sensory data comprises to use an Adaptive Kalman Filter.

16. The non-transitory computer readable medium of claim 14, wherein to classify an environment surrounding the wireless beacon comprises to collect environmental training data and classify the environment with a Support Vector Machine ("SVM") classifier using a linear kernel and the sensory data.

17. The non-transitory computer readable medium of claim 14, wherein to estimate a location of the wireless beacon and a probability for the location comprises to run a reverse regression to estimate the location and the probability for the location during a time window and according to the classified environment during the time window.

18. The system of claim 1, wherein said grouping a subset of the neighboring wireless beacons that exhibit a similar pattern of RSSI changes into a cluster comprises applying a fixed window Dynamic Time Warping (DTW) voting algorithm to the collected RSSI data.

19. The method of claim 9, wherein said grouping the subset of the neighboring wireless beacons into a cluster comprises applying a fixed window Dynamic Time Warping (DTW) voting algorithm to the collected RSSI data.

20. The non-transitory computer readable medium of claim 14, wherein said grouping a subset of the neighboring wireless beacons that exhibit a similar pattern of RSSI changes into a cluster comprises applying a fixed window Dynamic Time Warping (DTW) voting algorithm to the collected RSSI data.

\* \* \* \* \*